United States Patent
Kusumawardani et al.

(10) Patent No.: US 12,127,571 B2
(45) Date of Patent: Oct. 29, 2024

(54) PARTICULATE ACIDULANT COMPOSITION COMPRISING MALIC ACID AND LACTIC ACID

(71) Applicant: Purac Biochem B.V., Gorinchem (NL)

(72) Inventors: Heny Kusumawardani, Papendrecht (NL); Prita Pritawardani, Gorinchem (NL); Apostolos Papageorgiou, Gorinchem (NL); Cynthia Berenice Marmolejo, Utrecht (NL)

(73) Assignee: PURAC BIOCHEM B.V., Gorinchem (NL)

( * ) Notice: Subject to any disclaimer, the term of this patent is extended or adjusted under 35 U.S.C. 154(b) by 933 days.

(21) Appl. No.: 16/833,196

(22) Filed: Mar. 27, 2020

(65) Prior Publication Data
US 2020/0337349 A1   Oct. 29, 2020

Related U.S. Application Data

(63) Continuation of application No. PCT/EP2018/076141, filed on Sep. 26, 2018.

(30) Foreign Application Priority Data

Sep. 29, 2017 (EP) .................................. 17194215

(51) Int. Cl.
*A23L 27/00* (2016.01)
*A23G 3/34* (2006.01)
(Continued)

(52) U.S. Cl.
CPC ............ *A23L 27/82* (2016.08); *A23G 3/0085* (2013.01); *A23G 3/343* (2013.01); *A23G 3/36* (2013.01); *A23P 10/40* (2016.08); *A23V 2002/00* (2013.01)

(58) Field of Classification Search
CPC ....... A23P 10/40; A23L 27/82; A23G 3/0085; A23G 3/343; A23G 3/36
See application file for complete search history.

(56) References Cited

U.S. PATENT DOCUMENTS

| 5,186,965 A | 2/1993 | Fox et al. |
| 2007/0231455 A1* | 10/2007 | Bontenbal ............... A23G 3/346 426/660 |

(Continued)

FOREIGN PATENT DOCUMENTS

| EP | 0 372 695 A | 6/1990 |
| EP | 0 984 704 B1 | 3/2000 |

(Continued)

OTHER PUBLICATIONS

Anonymous: "PURAC Powder 55", May 2, 2017 (May 2, 2017), pp. 1-1, XP055427298, Retrieved from the Internet: URL:http://www.corbion.com/static/download s/datasheets/58psl/PDS- PURAC Powder 55.pdf [retrieved on Nov. 21, 2017] p. 1.

(Continued)

*Primary Examiner* — Stephanie A Cox
(74) *Attorney, Agent, or Firm* — Foley & Lardner LLP; Sunit Talapatra

(57) ABSTRACT

The invention relates to a particulate acidulant composition comprising 20-70 wt. % malic acid, 3-40 wt. % lactic acid and 0-40 wt. % of food acid selected from citric acid, fumaric acid, adipic acid, tartaric acid and acetic acid and combinations thereof, wherein the acidulant composition comprises:
40-90 wt. % of M-particles comprising co-crystal of malic acid and partially neutralized polycarboxylic acid selected from malic acid, citric acid, fumaric acid, adipic acid, tartaric acid, and combinations thereof, said M-particles containing at least 30 wt. % malic acid and at least 30 wt. % of the partially neutralized polycarboxylic acid;

(Continued)

5-60 wt. % of L-particles comprising co-crystal of lactic acid and at least partially neutralized carboxylic acid selected from lactic acid, malic acid, citric acid, fumaric acid, adipic acid, tartaric acid, and combinations thereof, said L-particles containing at least 30 wt. % lactic acid and at least 30 wt. % of the at least partially neutralized polycarboxylic acid; and wherein the combination of M-particles and L-particles constitutes at least 50 wt. % of the acidulant composition. The invention also relates to a particulate coating composition, to a method of preparing a food ingredient or a food product and to a confectionery product.

6 Claims, 2 Drawing Sheets

(51) Int. Cl.
*A23G 3/36* (2006.01)
*A23P 10/40* (2016.01)

(56) References Cited

U.S. PATENT DOCUMENTS

| | | |
|---|---|---|
| 2007/0269577 A1 | 11/2007 | Pershad et al. |
| 2008/0014312 A1 | 1/2008 | Notebaart et al. |
| 2009/0130251 A1 | 5/2009 | Perry et al. |

FOREIGN PATENT DOCUMENTS

| | | |
|---|---|---|
| WO | WO-2007/022069 A1 | 2/2007 |
| WO | WO-2008/006878 A1 | 1/2008 |

OTHER PUBLICATIONS

Anonymous: "PURAC Powder MA", Mar. 7, 2017 (Mar. 7, 2017), pp. 1-1, XP055426983, www.corbion.com Retrieved from the Internet: URL:http://www.corbion.com/static/download s/datasheets/359pcs/PDS-PURAC Powder MA.pdf [retrieved on Nov. 20, 2017] p. 1.

Anonymous: "Unleash the power of sour—PURAC Powder acid sanding in soft confectionery", corbion.com/confectionery, Apr. 20, 2016 (Apr. 20, 2016), pp. 1-2, XP055426600, Retrieved from the Internet: URL:https://web.archive.org/web/2016042004 4323/http://www.corbion.com/base/Download Helper/DownloadFile/9727 [retrieved on Nov. 20, 2017] —p. 1, col. 1, paragraph 1—p. 2, col. 2, paragraph 1;tables.

International Search Report mailed Nov. 27, 2018 in corresponding International Application No. PCT/EP2018/076141, 3 pages.

Kraig A. Wheeler et al: "Rediscovering Pasteur's Quasiracemates", Angewandte Chemie International Edition, vol. 47, No. 1, Nov. 16, 2007 (Nov. 16, 2007), pp. 78-81, XP055426530, ISSN: 1433-7851, DOI: 10.1002/anie.200704007, p. 79, col. 1, paragraph 1—col. 2, paragraph 5.

\* cited by examiner

PARTICULATE ACIDULANT COMPOSITION COMPRISING MALIC ACID AND LACTIC ACID

CROSS-REFERENCE TO RELATED APPLICATIONS

This application is a continuation of International Application No. PCT/EP2018/076141, filed Sep. 26, 2018, which claims the benefit of and priority to European Application No. 17194215.4, filed Sep. 29, 2017, both of which are hereby incorporated by reference herein in their entireties.

TECHNICAL FIELD OF THE INVENTION

The present invention relates to a particulate acidulant composition comprising malic acid, lactic acid and optionally one or more other food acids. The invention also relates to the application of this acidulant composition in food ingredients and food products.

The particulate acidulant composition of the present invention imparts a unique tangy flavour impression to food products due to the fact that the composition comprises particles in which malic acid and/or lactic acid are present as co-crystals of carboxylate salts.

BACKGROUND OF THE INVENTION

Food acids are added to food products to introduce sourness and to make flavours "sharper". In addition, food acids can act as preservatives and antioxidants. Common food acids include acetic acid, citric acid, tartaric acid, malic acid, fumaric acid, and lactic acid.

Sourness is the taste that detects acidity. Sour taste is detected by a small subset of cells that are distributed across all taste buds in the tongue. There is evidence that the protons that are abundant in sour substances can directly enter the sour taste cells through apically located ion channels. It has also been proposed that weak acids such as acetic acid, which are not fully dissociated at physiological pH values, can penetrate taste cells and thereby elicit an electrical response.

Children generally enjoy sour flavours and it is therefore not surprising that sour candy is very popular amongst children. Many of these candies contain citric acid.

Although food acids share the capability to introduce sourness, the flavour (taste+aroma) contribution of food acids can be very different as is evident, for instance, from a comparison of the flavour contribution of acetic acid (vinegar) with that of citric acid (lemon). Due to these difference in flavour contribution food acids may suitably be blended to create a desired flavour contribution.

The flavour contribution of a blend of food acids is not only determined by the relative concentrations of the food acids within the blend, but also by the in-mouth release of the individual acids. More particularly, the flavour contribution of the food acids is dependent on the rate at which each of these acids is released into saliva. The rate at which food acids are released into saliva can be manipulated, for instance, by encapsulating food acids in a matrix that retards the release of food acids into saliva.

EP-A 0 372 695 relates to a delivery system for food acids designed to be incorporated into chewing gum and confectionery compositions to impart prolonged tartness, sourness and increased salivation. The delivery system comprises food acid encapsulated in low molecular weight polyvinyl acetate material.

U.S. Pat. No. 5,186,965 describes to a metastable complex of calcium, citrate, and malate, The salt is prepared by the reaction of calcium carbonate, calcium hydroxide or calcium oxide with citric and malic acids in aqueous solution, followed by drying at a temperature of less than 100° C.

Wheeler et al. (*Rediscovering Pasteur's Quasiracemates*, Angewandte Chemie v.47, n1, 16, November 2007) describe three-component crystals formed from recrystallization of ammonium-bitartrate ammonium-bimalate. The authors refer to a paper by Pasteur in which he describes the formation of unusual compounds he referred to as "combination isomers". The two examples cited in his 1853 paper were derived from ammonium (+)-bitartrate/(−)-bimalate and (+)-tartramide/(−)-malamide components. These materials showed diminished optical behaviour and notably different solubilities relative to the enantiopure building blocks.

US2007/0269577 describes particulate compositions comprising an acid blend, including at least one encapsulated ingredient. The examples describe coating compositions containing malic acid encapsulated in hydrogenated vegetable oil and a blend of lactic acid and malic acid encapsulated together in isomalt.

US 2008/0014312 describes a food-grade particle comprising a core-coating configuration wherein the coating comprises at least one layer, each of which layers being made of a composition comprising at least 50 wt % of a partially neutralized polycarboxylic acid, wherein said partially neutralized polycarboxylic acid comprises at least one carboxylic group in the acid form and at least one carboxylic group in the salt form and wherein the core comprises at least one food-grade acid or a salt thereof. The examples of the US patent application describe the preparation of coated acid particles in a fluidized bed dryer by spraying an aqueous solution of mono-sodium hydrogen malate onto a fluidized bed of a 1:1 mixture of malic acid and sodium mono malate.

A product leaflet titled "Unleash the power of sour—PURAC® Powder acid sanding in soft confectionary", issued by Corbin Purac describes different acid powders. PURAC® Powder MA is a malic acid powder that provides high stability, low hygroscopicity and an instant, clean, taste profile. PURAC® Powder 55 and PURAC® Powder 60 are lactic acid powders that are highly stable, deliver long lasting sour intensity and maintain the appetizing appearance of soft confectionery.

A product data sheet for PURAC® Powder MA (Rev.No. 8/5172, Print date 7 Mar. 2017) describes PURAC® Powder MA as a coated malic acid powder. The powder contains 42-50% (w/w) sodium hydrogen malate and 50-58% (w/w) malic acid.

A product data sheet for PURAC® Powder 55 (Rev.No.12/5120, Print date 2 May 2017) describes PURAC® Powder 55 as consisting of lactic acid and calcium lactate. The powder contains 53.0-57.0% lactic acid and 40.0-45.0% calcium lactate.

A co-crystal is a crystalline structure composed of at least two components, where the components may be atoms, ions or molecules. Powder X-Ray diffraction is commonly used to characterize co-crystals. Co-crystal engineering is relevant to production of energetic materials, pharmaceuticals, and other compounds. Of these, the most widely studied and used application is in drug development and more specifically, the formation, design, and implementation of active pharmaceutical ingredients, or API's. The engineering of co-crystals takes advantage of the specific properties of each component to make the most favourable conditions for solubility that could ultimately enhance the bioavailability of the drug.

SUMMARY OF THE INVENTION

The inventors have developed a particulate acidulant composition comprising a combination of malic acid, lactic acid and optionally one or more other food acids, which acidulant composition provides a unique flavour contribution due to the fact that it comprises particles in which malic acid is present as a co-crystalline component in combination with particles in which lactic acid is present as a co-crystalline component.

More particularly, the present invention relates to a particulate acidulant composition comprising 20-70 wt. % malic acid, 3-40 wt. % lactic acid and 0-40 wt. % of food acid selected from citric acid, fumaric acid, adipic acid, tartaric acid and acetic acid and combinations thereof, wherein the acidulant composition comprises:
- 40-90 wt. % of M-particles comprising co-crystal of malic acid and partially neutralized polycarboxylic acid selected from malic acid, citric acid, fumaric acid, adipic acid, tartaric acid, and combinations thereof, said M-particles containing at least 30 wt. % malic acid and at least 30 wt. % of the partially neutralized polycarboxylic acid;
- 5-60 wt. % of L-particles comprising co-crystal of lactic acid and at least partially neutralized carboxylic acid selected from lactic acid, malic acid, citric acid, fumaric acid, adipic acid, tartaric acid, and combinations thereof, said L-particles containing at least 30 wt. % lactic acid and at least 30 wt. % of the at least partially neutralized polycarboxylic acid; and wherein the combination of M-particles and L-particles constitutes at least 50 wt. % of the acidulant composition.

Although the inventors do not wish to be bound by theory, it is believed that the in-mouth release of malic acid and lactic acid from the particles containing these acids in the form of co-crystals of carboxylate salt is very different from the release of these acids from particles in which they are present in a pure crystalline state or as part of an amorphous blend. Thus, the acidulant composition provides a unique flavour contribution to food products, provided the particles remain essentially intact during production of these food products.

In addition, the particulate acidulant composition of the present invention offers the important advantage that its hygroscopicity is low. Thus, the acidulant composition retains free flowing properties even if the composition is stored under ambient conditions.

The particulate acidulant composition of the present invention is particularly suited for application in confectionery products such as candy and chewing gum, and in dry particulate products such as instant soups and sauces, tea, instant drinks, instant desserts. Preferably, the acidulant composition is applied in confectionery products. The acidulant composition may suitably be applied onto such confectionery products as part of a particulate coating composition.

The invention also provides a particulate coating composition comprising a blend of sugar particles, M-particles and L-particles.

The invention further relates to a method of preparing a food ingredient or a food product, said method comprising combining the aforementioned acidulant composition or the aforementioned particulate coating composition with one or more non-aqueous ingredients.

Also provided is a confectionery product comprising:
0.3-10 wt. % of M-particles; and
0.1-10 wt. % of L-particles.

DETAILED DESCRIPTION OF THE INVENTION

Figure 1:
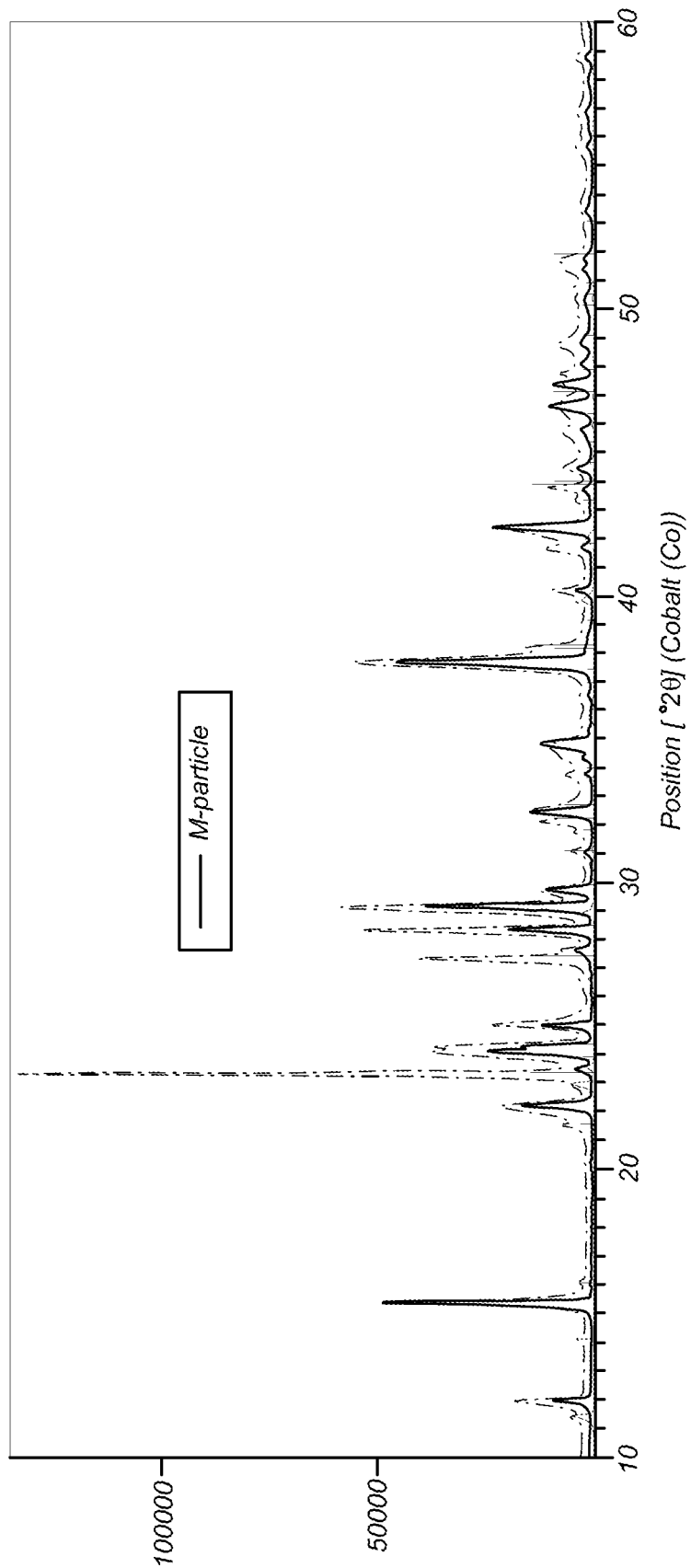
FIG. 1 shows the XRPD pattern of the M-particles according to the invention.

Accordingly, a first aspect of the invention relates to a particulate acidulant composition comprising 20-70 wt. % malic acid, 3-40 wt. % lactic acid and 0-40 wt. % of food acid selected from citric acid, fumaric acid, adipic acid, tartaric acid and acetic acid and combinations thereof, wherein the acidulant composition comprises:
- 40-90 wt. % of M-particles comprising co-crystal of malic acid and partially neutralized polycarboxylic acid selected from malic acid, citric acid, fumaric acid, adipic acid, tartaric acid, and combinations thereof, said M-particles containing at least 30 wt. % malic acid and at least 30 wt. % of the partially neutralized polycarboxylic acid;
- 5-60 wt. % of L-particles comprising co-crystal of lactic acid and at least partially neutralized carboxylic acid selected from lactic acid, malic acid, citric acid, fumaric acid, adipic acid, tartaric acid, and combinations thereof, said L-particles containing at least 30 wt. % lactic acid and at least 30 wt. % of the at least partially neutralized polycarboxylic acid; and wherein the combination of M-particles and L-particles constitutes at least 50 wt. % of the acidulant composition.

Whenever reference is made herein to a particular food acid (e.g. malic acid, lactic acid, citric acid, fumaric acid, adipic acid, tartaric acid or acetic acid), unless indicated otherwise, what is meant is the free acid, whether in free form or as a component in a co-crystal.

The term "co-crystal of malic acid and partially neutralized polycarboxylic acid" as used herein refers to a crystalline structure comprising at least 25 wt. % malic acid and at least 25 wt. % partially neutralized polycarboxylic acid.

The term "co-crystal of lactic acid and at least partially neutralized carboxylic acid" as used herein refers to a crystalline structure comprising at least 30 wt. % lactic acid and at least 30 wt. % partially neutralized carboxylic acid".

The term "at least partially neutralized carboxylic acid" encompasses fully neutralized monocarboxylic acid, partially neutralized polycarboxylic acid and fully neutralized polycarboxylic acid.

The partially neutralized polycarboxylic acid and the at least partially neutralized carboxylic acid may be present in the acidulant composition in anhydrous form or in the form of hydrates.

The particulate acidulant composition of the present invention preferably comprises 25-60 wt. % malic acid, more preferably 30-50 wt. % malic acid and most preferably 32-45 wt. % malic acid.

The lactic acid content of the particulate acidulant composition is preferably in the range of 4-35 wt. %, more preferably in the range of 5-30 wt. % and most preferably in the range of 6-25 wt.%.

The particulate acidulant composition preferably contains 0-30 wt. %, more preferably 0-18 wt. % and most preferably 2-12 wt. % of food acid selected from citric acid, fumaric acid, adipic acid, tartaric acid and acetic acid and combinations thereof. The inclusion of additional food acids besides malic and lactic acid adds to the complexity of the acidulant composition's flavour contribution. However, ambient stability of the composition can be adversely affected by incorporation of these other food acids in concentrations of more than 10 wt. %.

Besides malic acid, lactic acid and optional other free acids, the particulate acidulant composition typically contains at least 20 wt. %, more preferably at least 25 wt. % and most preferably 30-60 wt. % salts of carboxylic acids.

The M-particles comprising co-crystal of malic acid and partially neutralized polycarboxylic acid, preferably constitute 60-88 wt. % of the acidulant composition. Most preferably, the M-particles constitute 70-85 wt. % of the acidulant composition.

The L-particles comprising co-crystal of lactic acid and at least partially neutralized carboxylic acid preferably constitute 6-35 wt. %, most preferably 8-32 wt. % of the acidulant composition.

The partially neutralized polycarboxylic acid in the M-particles is preferably selected from mono-sodium or mono-potassium hydrogen malate, mono-sodium or mono-potassium dihydrogen citrate, di-sodium or di-potassium hydrogen citrate, and combinations hereof. More preferably, the partially neutralized polycarboxylic acid in the M-particles is selected from mono-sodium hydrogen malate, mono-potassium hydrogen malate and combinations thereof. Most preferably, the partially neutralized polycarboxylic acid in the M-particles is mono-sodium hydrogen malate.

According to a particularly preferred embodiment, the M-particles comprise co-crystal of malic acid and mono-sodium hydrogen malate and the L-particles comprise co-crystal of lactic acid and calcium lactate.

The M-particles in the acidulant composition can suitably be prepared in a fluid bed dryer by spraying an aqueous solution of partially neutralized polycarboxylic acid onto particles of malic acid. In M-particles prepared in this manner, the core contains malic acid in a concentration that is at 10 wt. % higher, more preferably at least 20 wt. % higher and most preferably at least 30 wt. % higher than the average malic acid concentration of these particles. The presence of this type of M-particles in the acidulant composition was found to have the advantageous effect that the sourness perception is prolonged.

The term "core" as used herein in relation to a particles refers to the centre of such a particle.

The at least partially neutralized carboxylic acid in the L-particles preferably is neutralized lactic acid, most preferably calcium lactate.

The L-particles in the acidulant composition can suitably be prepared in a fluid bed dryer by spraying an aqueous solution of lactic acid onto particles of at least partially neutralized carboxylic acid. In L-particles prepared in this manner, the core contains at least partially neutralized carboxylic acid in a concentration that is at 10 wt. % higher, more preferably at least 20 wt. % higher and most preferably at least 30 wt. % higher than the average concentration of partially neutralized carboxylic acid (e.g. calcium lactate) in these particles. The presence of this type of L-particles in the acidulant composition was found to have the advantageous effect that an almost instantaneous sourness perception can be achieved.

According to a particularly preferred embodiment, the particulate acidulant composition comprises a combination of M-particles having a relatively high malic acid concentration in the core and L-particles having a relatively high neutralized carboxylic acid concentration in the core. The application of this particular combination of M-particles and L-particles was found to produce a sourness impression that is almost instantaneous and that continues for a long time.

Co-crystals of malic acid and partially neutralized polycarboxylic acid and co-crystals of lactic acid and the at least partially neutralized carboxylic acid can be detected with the help of X-ray powder diffraction (XRPD). This technique distinguishes the co-crystal by comparing its peak positions and intensities observed in the powder pattern to all known free base forms of the material. The amount of the co-crystals in a material may be quantified by means of XRPD, however other methods such as Raman spectroscopy may be preferred for a more accurate quantification.

According to a particularly preferred embodiment, at least 20 wt. %, more preferably at least 23 wt. % and most preferably at least 25 wt. % of the malic acid in the M-particles is present in the co-crystal of malic acid and partially neutralized polycarboxylic acid.

According to another preferred embodiment, at least 25 wt. %, more preferably at least 27 wt. % and most preferably at least 30 wt. % of the lactic acid in the L-particles is present in the co-crystal of lactic acid and the at least partially neutralized carboxylic acid.

Besides malic acid and lactic acid, the acidulant composition may suitably contain one or more food acids selected from citric acid, fumaric acid, adipic acid, tartaric acid and acetic acid. According to a preferred embodiment, these other food acids are present in the acidulant composition in the form of particles that largely consist of free acid (A-particles). Accordingly, in a preferred embodiment the acidulant composition comprises 2-30 wt. %, more preferably 3-20 wt. % of A-particles containing at least 80 wt. % of food acid selected from citric acid, fumaric acid, adipic acid, tartaric acid and acetic acid and combinations thereof.

The particulate acidulant composition of the present invention preferably comprising at least 90 wt. % particles having a diameter in the range of 120-1200 μm, more preferably in the range of 150-1100 μm, and most preferably in the range of 200-1000 μm. The particle size distribution of the acidulant composition can suitably be determined with the help of laser diffraction.

A further aspect of the invention relates to a particulate coating composition comprising:
  30-98 wt. % sugar particles;
  2-40 wt. % of M-particles comprising co-crystal of malic acid and partially neutralized polycarboxylic acid selected from malic acid, citric acid, fumaric acid, adipic acid, tartaric acid, and combinations thereof, said M-particles containing at least 30 wt. % malic acid and at least 30 wt. % of the partially neutralized polycarboxylic acid;
  0.5-10 wt. % of L-particles comprising co-crystal of lactic acid and at least partially neutralized carboxylic acid selected from lactic acid, malic acid, citric acid, fumaric acid, adipic acid, tartaric acid, and combinations thereof, said L-particles containing at least 30 wt. % lactic acid and at least 30 wt. % of the at least partially neutralized polycarboxylic acid.

The M-particles and L-particles that can be employed in the particulate coating composition are the same M-particles and L-particles as defined herein before in relation to the particulate acidulant composition of the present invention.

Preferably, the particulate coating composition comprises 40-96 wt. %, more preferably 45-92 wt. % and most preferably 50-90 wt. % sugar particles.

M-particles are preferably contained in the coating composition in a concentration of 3-35 wt. %, more preferably of 4-30 wt. % and most preferably of 5-27 wt. %.

L-particles are preferably contained in the coating composition in a concentration of 0.8-9 wt. %, more preferably of 1-8.5 wt. % and most preferably of 1.2-8 wt. %.

The coating composition of the present invention may suitably be applied to prepare acid-sanded confectionery. Acid-sanding, is the coating of confectionery with a blend of sugar and acid powder.

Another aspect of the invention relates to a method of preparing a food ingredient or a food product, said method comprising combining the particulate acidulant composition as defined herein before or the particulate coating composition as defined herein before with one or more non-aqueous ingredients.

In the present method, the particulate acidulant composition or the particulate coating composition is preferably not contacted with aqueous liquids so as to ensure that the M-particles and L-particles remain largely intact.

The present method of preparing a food ingredient or a food product preferably comprises combining the acidulant composition with one or more ingredients selected from sugars; polyols; flavouring; colouring; plant, vegetable, fruit, or flower extracts; spices; herbs; citrus fibres, dietary, fibers; essential oils; chocolate; cacao; nuts; dairy products; fortifying agents.

In one embodiment of the present the acidulant composition is incorporated in a food ingredient in a concentration of 0.1-30 wt. %, more preferably of 0.15-25 wt. % and most preferably of 0.2-20 wt. %.

According to a preferred embodiment, acidulant composition is incorporated in a particulate food ingredient together with particulate sugar. Particulate sugar is preferably incorporated in the food ingredient in a concentration of 30-98 wt. %, more preferably of 40-95 wt. % and most preferably of 50-90 wt. %.

Examples of food ingredients that may suitably be prepared by the present method include coating compositions, such as the particulate coating composition described herein.

In another embodiment of the invention the particulate acidulant composition or the particulate coating composition is applied in a confectionery product, more preferably a confectionery product selected from candies and chewing gum.

The acidulant composition is preferably applied in the food product in a concentration of 0.01-20 wt. %, more preferably of 0.1-15 wt. % and most preferably of 1-10 wt. %.

The particulate coating composition is preferably applied in the food product in a concentration of 1-70 wt. %, more preferably of 2-60 wt. % and most preferably of 5-50 wt. %.

According to a particularly preferred embodiment, the particulate coating composition is applied as a coating onto the food product.

Yet another aspect of the invention relates to a confectionery product comprising:

0.3-90 wt. % of M-particles comprising co-crystals of malic acid and partially neutralized polycarboxylic acid selected from malic acid, citric acid, fumaric acid, adipic acid, tartaric acid, and combinations thereof, said M-particles containing at least 30 wt. % malic acid and at least 30 wt. % of the partially neutralized polycarboxylic acid; and 0.1-60 wt. % of L-particles comprising co-crystals of lactic acid and at least partially neutralized carboxylic acid selected from lactic acid, malic acid, citric acid, fumaric acid, adipic acid, tartaric acid, and combinations thereof, said L-particles containing at least 30 wt. % lactic acid and at least 30 wt. % of the at least partially neutralized polycarboxylic acid.

The M-particles and L-particles that can be employed in the confectionery product are the same M-particles and L-particles as defined herein before in relation to the particulate acidulant composition of the present invention.

The M-particles are preferably contained in the confectionery product in a concentration of 0.5-80 wt. %, more preferably in a concentration of 0.6-70 wt. % and most preferably in a concentration of 0.7-60 wt. %.

The concentration of L-particles in the confectionery product is preferably in the range of 0.2-50 wt. %, more preferably of 0.25-40 wt. % and most preferably of 0.3-30 wt. %.

The confectionery product preferably contains 1-70 wt. %, more preferably 3-50 wt. % and most preferably 6-40 wt. % sugar.

The confectionery product of the present invention preferably is a candy, chocolate or a chewing gum. Examples of candies soft candy (hydrocolloid based and/or soft panned), hard candy (hard boiled and/or hard panned) an aerated candy. According to a particularly preferred embodiment, the confectionery product is a candy, most preferably an acid sanded candy.

According to a particularly preferred embodiment, the M-particles and L-particles are contained in a coating layer that surrounds the core of the confectionery product. The coating layer preferably has the same composition as the particulate coating composition described herein.

The invention is further illustrated by the following non-limiting examples.

EXAMPLES

Example 1

Particulate acidulant compositions according to the present invention were prepared by dry blending food acid components in accordance with the recipes shown in Table 1.

TABLE 1

| | Wt. % | | | |
| --- | --- | --- | --- | --- |
| | 1 | 2 | 3 | 4 |
| M particles [1] | 80 | 80 | 80 | 80 |
| L particles [2] | 20 | 15 | 14 | 14 |
| Citric acid [3] | | 5 | | 3 |
| Tartaric acid [4] | | | 6 | 3 |

[1] Purac ® Powder MA (42-50 wt. % sodium hydrogen malate; 50-58 wt. % malic acid; ≥95% < 710 µm; produced in fluid bed dryer by spraying aqueous solution of sodium hydrogen malate onto a bed of malic acid particles)
[2] Purac ® Powder 55 (53-57 wt. % lactic acid; 40-45 wt. % calcium lactate, 1-3 wt. % silicates; ≥98% < 710 µm; produced in fluid bed dryer by spraying aqueous solution of lactic acid onto a bed of calcium lactate particles)
[3] Citric acid anhydrous (99.5 wt % citric acid, D[4, 3] 950 µm RFI Food Ingredients)
[4] L(+) Tartaric acid powder (99.5 wt % tartaric acid, 295-400 µm, Distillerie Bonollo FIG. 1 shows the XRPD pattern of the M-particles. From this pattern it can be deduced that a substantial part of the M-particles consisted of co-crystal of malic acid and sodium hydrogen malate.

Figure 2:
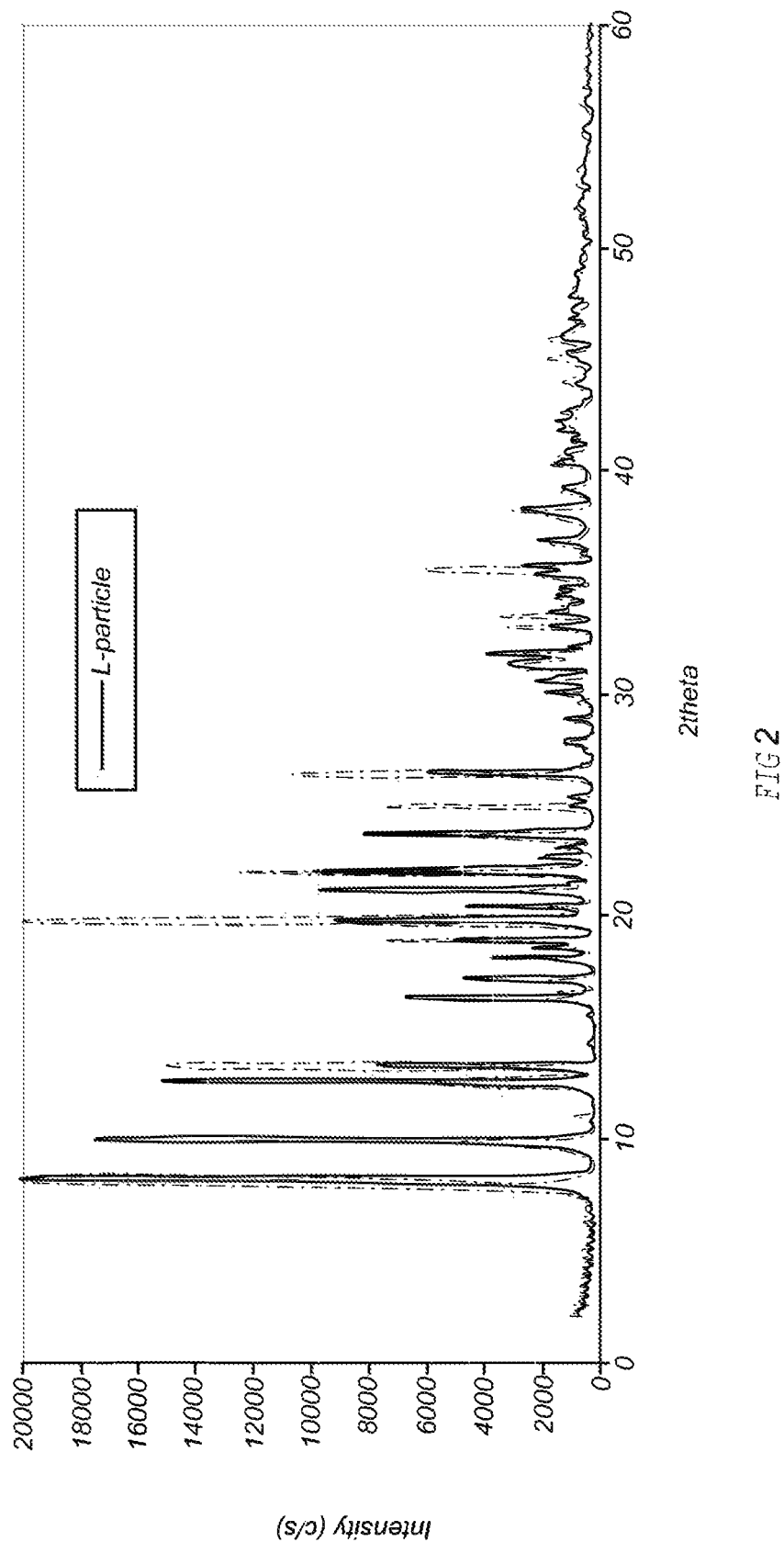
FIG. 2 shows the XRPD pattern of the L-particles according to the invention.

FIG. 2 shows the XRPD pattern of the L-particles. From this pattern it can be deduced that a substantial part of the L-particles consisted of co-crystal of lactic acid and calcium lactate.

The particulate acidulant compositions 1 to 4 were subjected to the following tests:

Hygroscopicity of the acidulant composition at 30° C., 75% RH;

Acid migration into gelatine mass at 30° C., 75% RH; Acid migration is tested, by spreading ±0.5 g acidulant formulation on the surface of a gelatine tube. When the acid migrates into the gel a change of pH creates a colored layer that can be measured in thickness (mm), and compared between the samples. Monitoring the migration layer and appearance is performed every 2 days during at least 14 days.

Sensory analyses of acid sanded jelly candies, prepared using a coating blend comprising 30 wt. % acidulant composition and 70 wt. % sugar. The acid sanded jelly candies were prepared by applying the coating onto commercially available gummy candy (Haribo® gold bears) using steam. The coated candies were evaluated by an expert panel 4 weeks after preparation. Sensory evaluation was performed on sour intensity (score 1-10) and time lapse to first sour perception (in seconds).

The results of these tests are shown in Table 2

TABLE 2

| | 1 | 2 | 3 | 4 |
|---|---|---|---|---|
| Hygroscopicity [1] | 16.6% | 18.6% | 18.2% | 18.0% |
| Acid migration [2] | 4.5 mm | 4.5 mm | 4.0 mm | 5.0 mm |
| Sensory evaluation—sour intensity (score 1 minimum; to 10 maximum) | 7.2 | 7.7 | 7.3 | 7.7 |
| Sensory evaluation—time lapse till first sour perception (seconds). | 2.6 | 2.2 | 2.3 | 1.9 |

[1] Maximum percentage water uptake after 16 days at 30° C., RH = 75%
[2] Penetration equal or below 5 mm is satisfactory as long as the acidulant is not liquefied.

No liquefaction was observed for any of the acidulant compositions in the acid migration test.

Comparative Example A

Acid sanded jelly candies were prepared in the same way as in Example 1, except that this time the acidulant composition consisted of malic acid powder comprising co-crystal of malic acid and sodium hydrogen malate (Purac® Powder MA).

It was found that the candies prepared with this malic acid powder had a time lapse to first sour perception around 4 seconds, showing a prolonged effect but with a slow release of sourness. Moreover salty notes could be perceived which reduce the freshness of the flavour profile.

Comparative Example B

An acidulant composition is prepared by blending malic acid powder and lactic acid powder in a weight ratio of 80:20. This acidulant composition is tested in the same way as the acidulant compositions of Example 1.

It is found that the blend of malic acid powder and lactic acid powder is highly hygroscopic. Furthermore, this acid blend is found to produce a liquefied mass on the gelatine surface in the acid migration test.

The invention claimed is:

1. A particulate acidulant composition, comprising:
   (a) a total amount of 20-70 wt. % malic acid in the composition,
   (b) a total amount of 3-40 wt. % lactic acid in the composition, and
   (c) 0-40 wt. % of food acid selected from citric acid, fumaric acid, adipic acid, tartaric acid, acetic acid and combinations thereof,
   wherein the particulate acidulant composition comprises:
      (i) 40-90 wt. % of M-particles comprising a co-crystal of malic acid and mono-sodium hydrogen malate, the M-particles comprising at least 30 wt. % malic acid and at least 30 wt. % of the mono-sodium hydrogen malate, and wherein the M-particles have a core comprising malic acid in a concentration that is at least 10 wt. % higher than the average malic acid concentration of the M-particles;
      wherein the M-particle is characterized by an X-ray powder diffraction pattern having one or more peaks at about 15.2, 22.2, 24.2, 25.0, 28.3, 29.1, 32.4, 34.8, 37.6 and 42.5 degrees two-theta±0.2 degrees two-theta;
      (ii) 5-60 wt. % of L-particles consisting of a co-crystal of lactic acid and calcium lactate, the L-particles comprising at least 30 wt. % lactic acid and at least 30 wt. % of the calcium lactate, and wherein the L-particles have been prepared by spraying an aqueous solution of lactic acid onto particles of the calcium lactate;
      wherein the L-particle is characterized by an X-ray powder diffraction pattern having one or more peaks at about 8.0, 9.9, 12.5, 13.3, 17.6, 19.9, 20.5, 21.2, 22.0, 23.4, 26.2, and 31.8 degrees two-theta±0.2 degrees two-theta; and
   wherein the combination of M-particles and L-particles constitutes at least 50 wt. % of the acidulant composition.

2. The acidulant composition according to claim 1, comprising 60-88 wt. % of the M-particles.

3. The acidulant composition according to claim 1, comprising 6-35 wt. % of the L-particles.

4. The acidulant composition according to claim 1, wherein at least 25 wt. % of the malic acid in the M-particles is present in the co-crystal of malic acid and mono-sodium hydrogen malate.

5. The acidulant composition according to claim 1, wherein at least 30 wt. % of the lactic acid in the L-particles is present in the co-crystal of lactic acid and the calcium lactate.

6. The acidulant composition according to claim 1, wherein the acidulant composition is a powder comprising at least 90 wt. % particles having a diameter in the range of 120-1200 μm.

* * * * *